United States Patent [19]

Hillier

[11] 4,030,138

[45] June 14, 1977

[54] RECORD PROTECTION SYSTEM

[75] Inventor: James Hillier, Princeton, N.J.

[73] Assignee: RCA Corporation, New York, N.Y.

[22] Filed: July 18, 1975

[21] Appl. No.: 597,371

[52] U.S. Cl. .............................. 360/135; 360/97; 360/86; 206/444; 274/42 R
[51] Int. Cl.² ...................................... G11B 17/04
[58] Field of Search ................ 360/97, 98, 99, 86, 360/135; 206/444; 274/42

[56] References Cited

UNITED STATES PATENTS

| 3,035,840 | 5/1962 | Scott | 274/42 R |
|---|---|---|---|
| 3,109,539 | 11/1963 | Turoff | 206/310 |
| 3,662,360 | 5/1972 | Lambert | 360/97 |
| 3,668,658 | 6/1972 | Flores | 360/97 |

Primary Examiner—Harold I. Pitts
Attorney, Agent, or Firm—Eugene M. Whitacre; William H. Meagher; Dilip A. Kulkarni

[57] ABSTRACT

To protect a record, such as a video disc, from damage due to finger contact with the recorded area, a pair of finger holes are provided adjacent the centering aperture of the record. The record player and the package used for shipping or storing the record are each provided with a well for receiving the record. The spacing between a wall portion defining the edge of the well and the outer periphery of the record is such that the outer periphery of the record is not directly accessible, thereby constraining a user to handling the record by the finger holes. The player and the package are each provided with a finger cavity located underneath the finger holes regardless of the rotational orientation of the record when the record is in the well, in order to permit a sufficient penetration of the fingers so that the record may be firmly grasped for removal from the well.

12 Claims, 9 Drawing Figures

RECORD PROTECTION SYSTEM

The present invention relates generally to a system for protecting the recorded signal information on a record, such as a video disc, from damage during normal handling thereof, and to a record player apparatus and a record storage apparatus for use in such a system.

BACKGROUND OF THE INVENTION

During the normal use of a record, such as a video disc record, the record itself is directly handled by the user in several operations: for example, in order to (1) transfer the record from the package to the player and vice versa, (2) to turn over the record to play the other side thereof, et al.

Typically, the record is handled by the user by grasping substantially opposite portions of the outer periphery of the record by his two hands. The abovesaid handling is relatively inconvenient. Additionally, there is a danger of accidentally dropping the record because two hands are involved. Therefore, it is advantageous to provide means which allow the user to handle the record conveniently and with one hand.

Further, since the normal tendency of human fingers is to curl inward toward the palm of the hand, the abovesaid handling creates a risk of touching the critical (i.e., recorded) region of the record, with the danger of consequent marring of the surface of the recorded region with fingerprints. The fingerprints can cause a short and a long term chemical and physical degradation of the recorded information. Therefore, it is desirable to provide means for precluding the touching of the recorded region of the disc record during the proper handling thereof.

A variety of approaches to record handling exist in the prior art. For example, finger holes have been provided in the record label area (the unrecorded region between the recorded portion and the centering aperture of the record). This and other similar approaches suffer from one or more practical deficiencies; for example, there is no assurance that the user would pick up the record by grasping the finger holes and not the outer periphery of the record.

BRIEF SUMMARY OF THE INVENTION

In accordance with the principles of the present invention, the goal of protection of the recorded region of a record element is more successfully realized by not only providing the record with means convenient to handling of the record exclusively in the nonrecorded region (e.g., such as finger holes), but also modifying the structures which normally receive the record (such as the record player and the record's storage jacket) in a manner denying removal by lifting of the received record by other than the provided desirable handling means. To this end, a well is provided for receiving the record. The spacing between a wall portion defining an edge of the well and the outer periphery of a record, when the record is in place, is sufficiently small as to limit access to the record periphery in a manner effectively precluding direct grasping of the outer periphery of the record by the human hand. Complementary to such inhibition of grasping of the outer periphery of the record is the encouragement of grasping of the record by the finger holes in the nonrecorded region of the record.

A feature of the invention is the provision of a cavity so shaped and located as to lie beneath the record's finger holes when the record is in place despite its rotational orientation therein. The cavity is dimensioned to allow sufficient penetration of the human fingers in the finger holes so as to permit obtaining a good grasp of the record for purposes of removal from the well.

BRIEF DESCRIPTION OF THE DRAWINGS

In the accompanying drawings in which the reference characters refer to like parts.

DETAILED DESCRIPTION

Figure 1:
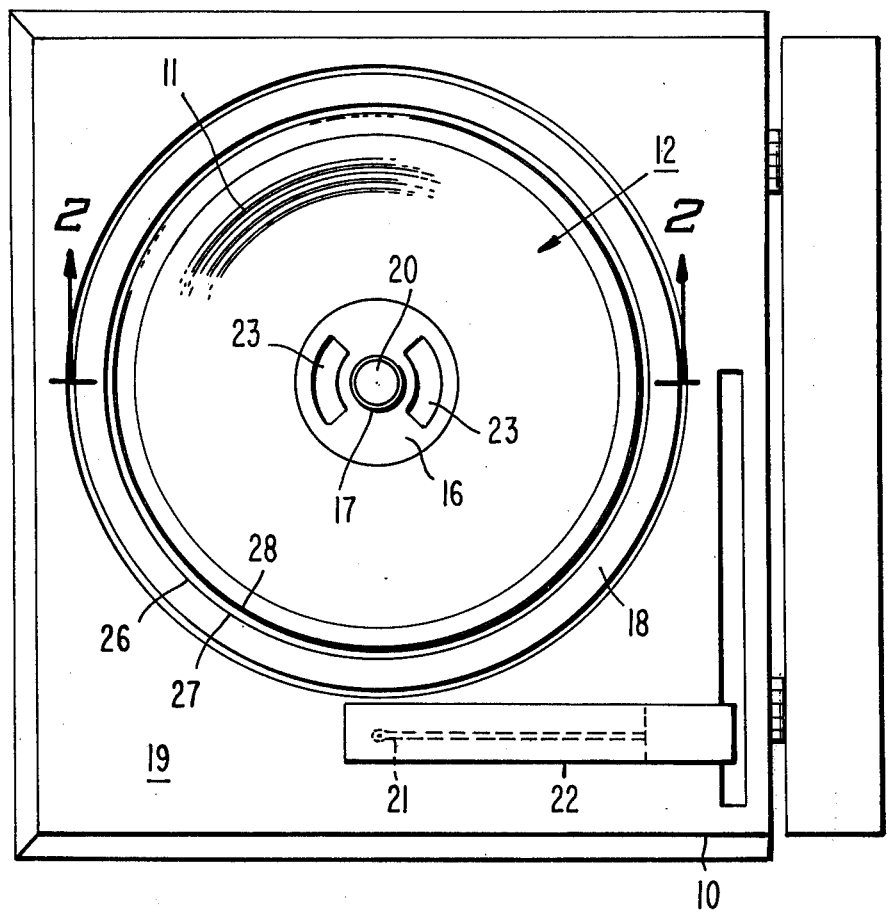
FIG. 1 is a top view of a disc record player embodying the present invention.

FIGS. 1, 2, 3 and 4 illustrate a disc record play 10 for playing back the signals stored in the form of a modulation along a spiral track in a recorded region 11 of a disc record 12. The record 12 may be of the type described in the U.S. Pat. No. 3,842,194 which, as illustrated in FIG. 5, includes a lubricated, protective dielectric layer 13 overlying a conductive coating 14 on a substrate base 15 of the record 12 in the recorded region 11 thereof. Illustratively, the lubricant may be a silicon base oil, the dielectric deposit 13 may be a layer of polystyrene, the conductive coating 14 may be a layer of relatively pure copper, and the substrate base 15 may be a vinyl compound of the type used for manufacturing audio disc records. The corrosive substances in the fingerprints may migrate through the lubricating and protective layers to the metallic coating. In the process of migration, the corrosive substances have a tendency to displace the lubricant and affect the dielectric constant of the dielectric layer. The corrosive substances reaching the metallic coating may cause oxidation thereof. The record 12 may also comprise an optical disc in which the signal information may be recovered in the form of variations in light reflected from or transmitted through a spiral track on the record.

As shown in FIG. 1, the record 12 includes an unrecorded region 16 (generally known as the label area) between a centering aperture 17 and the recorded region 11. The record 12 is rotatably mounted for playback on a turntable 18 secured to a motorboard 19. The turntable 18 has a spindle 20 adapted to snugly fit the centering aperture 17 of the record 12. In order to recover the signals stored in the recorded region 11 of the record 12, an appropriate relataive motion is established between a signal pickup 21, secured to a carriage 22 reciprocably mounted on the motorboard 19, and the track modulation in the recorded region of the record. The signals at the output of the pickup 21 are processed and coupled to an appropriate presentation device (for example, a television receiver).

Figure 3:
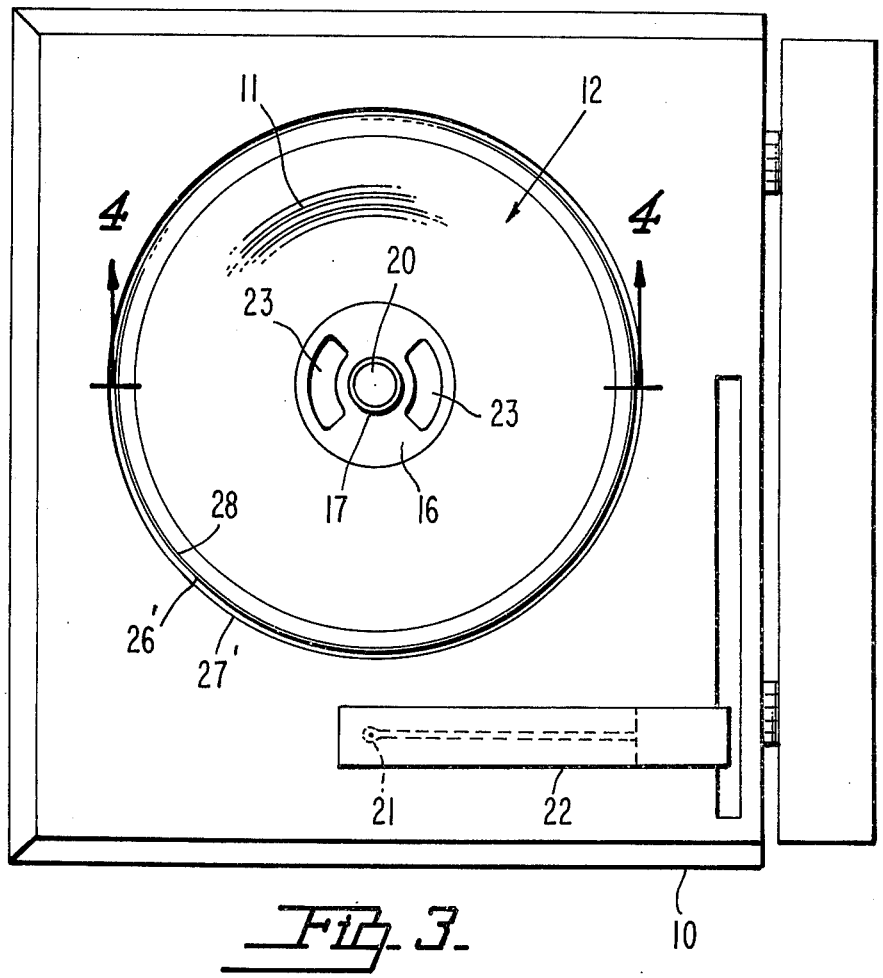
FIG. 3 is a top view of a modification of the player of FIG. 1 illustrating another embodiment of the present invention.
Figure 8:
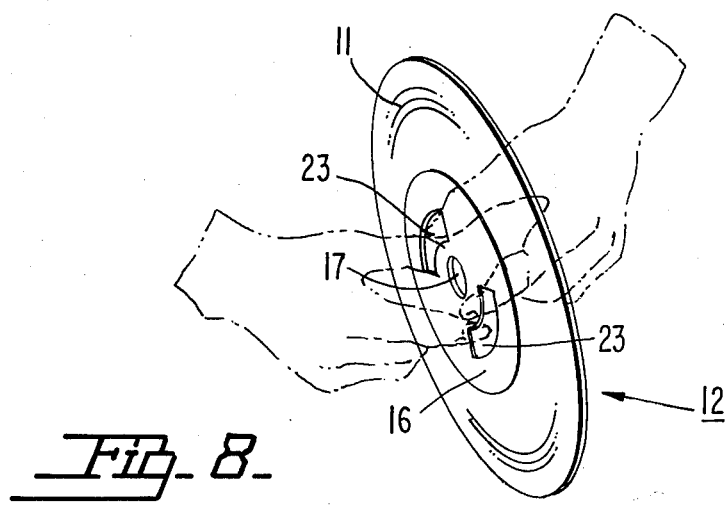
FIG. 8 illustrates a method of turning over the record of FIGS. 1, 2, 3, 4 and 7 in a manner that renders it unnecessary to touch the recorded region of the record during the handling thereof.
Figure 9:
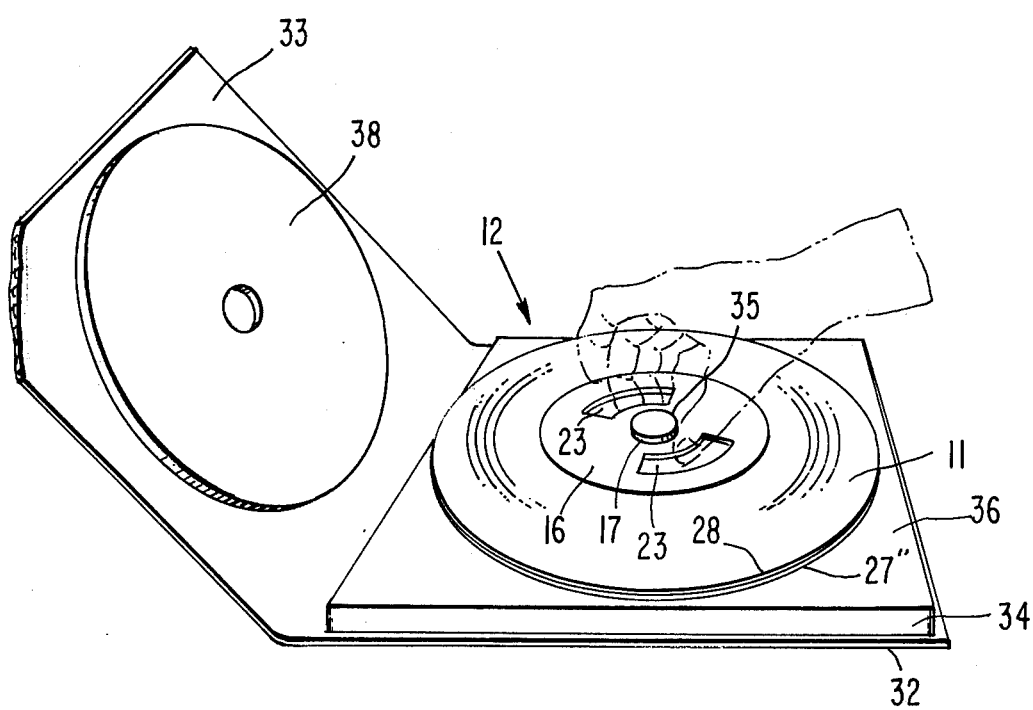
FIG. 9 illustrates the method of picking up the record of FIGS. 1, 2, 3, 4 and 7 by hand from the package of FIG. 7.

A pair of finger receiving holes 23 are provided adjacent to the centering aperture 17 in the unrecorded region 16 of the record 12. The finger holes 23 have dimensions which permit a comfortable entry of human fingers therein for grasping the record 12. One embodiment of the finger holes 23 is shown in FIGS. 1 and 3 where each of the finger holes is of a sufficient size to permit an easy passage of at least two fingers of the user therein in order to enable the user to pick up, place, or turn over the record without touching the recorded region 11 in a manner illustrated in FIGS. 8 and 9. In order to turn over the record without touching the recorded region, the record 12 is picked up by one hand (with fingers grasping the rib-like disc portions which are formed between the finger holes 23 and the centering aperture 17), transferred to the second hand (as illustrated in FIG. 8), and then set down by the second hand (as illustrated in FIG. 9).

Figure 6:
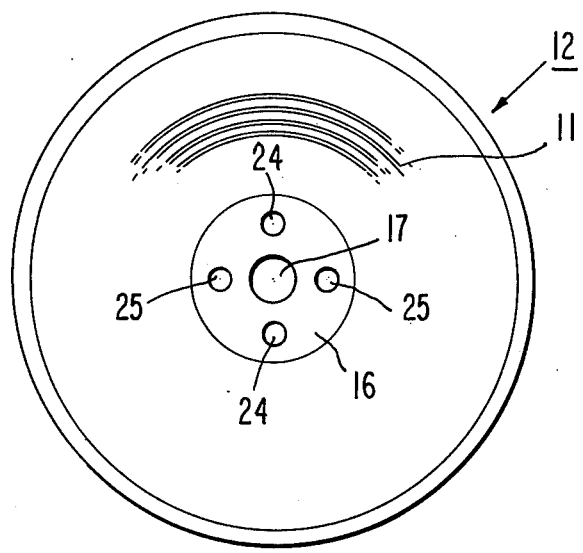
FIG. 6 illustrates an alternative form for the finger holes in the record.

Another embodiment of the finger holes is shown in FIG. 6. In FIG. 6, two pairs of finger holes 24 and 25 are provided adjacent to the centering aperture 17 in the unrecorded region 16 of the record 12 in order to permit the user to interchange the record between its package and the player and to turn over the record without touching the recorded region 11. In the embodiment of FIG. 6, each of the finger holes 24 and 25 is of a sufficient size to permit a comfortable entry of at least one finger of the user therein. For the purposes of the present invention, the term finger means any of the terminal members of the hand including the thumb.

The finger holes 23 in the record 12 are conveniently positioned with respect to the centering aperture 17 and with respect to each other to insure rotational balance at the record. Other factors, such as, esthetics, human engineering, and the disc record rigidity and drive requirements are also considered in the design of the finger holes.

The player 10 of FIG. 1 includes a well 26 for receiving the record 12 for playback purposes. The spacing between a continuous wall portion 27 defining the edge of the well 26 and the outer periphery 28 of the record 12 is sufficiently small such that grasping of the outer periphery of the record directly with a human hand is precluded.

Figure 2:
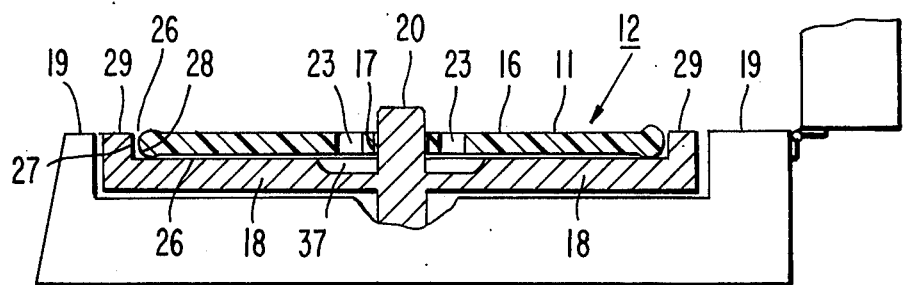
FIG. 2 is a side view of the player of FIG. 1 taken along the section lines 2—2 in FIG. 1.

In FIGS. 1 and 2, the turntable 18 has a rim 29 which is raised with respect to the record supporting portion of the turntable. The inner wall of rim 29 forms the aforementioned protective wall portion 27 defining the edge of the well 26 for receiving the record 12.

Figure 4:
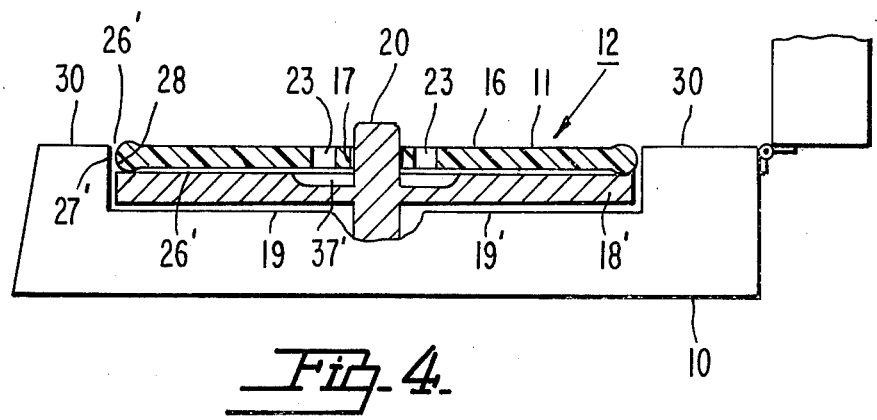
FIG. 4 is a side view of the player of FIG. 3 taken along the section lines 4—4 in FIG. 3.
Figure 5:
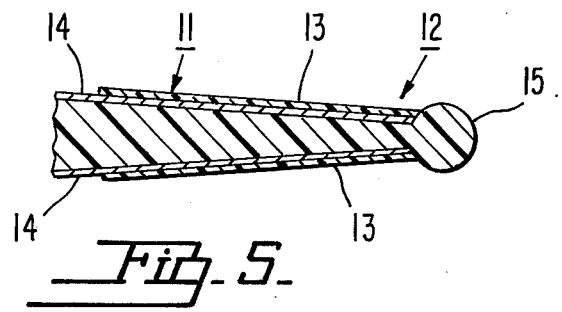
FIG. 5 is a sectional view of a portion of the recorded region of a video disc record.

In a further invention embodiment illustrated in FIGS. 3 and 4, the motorboard 19' has an elevated portion 30 which is raised with respect to the turntable 18'. An inner wall 27' of the elevated portion 30 of the motorboard 19' serves as the aforementioned protective wall portion 27 which defines the edge of the well 26' for receiving the record 12.

Figure 7:
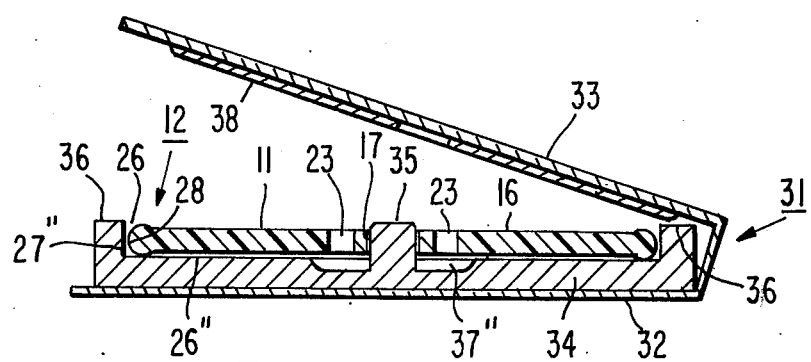
FIG. 7 is a sectional view of a package and a stored record embodying the present invention.

FIG. 7 illustrates a record jacket 31 for storing the record 12 between playbacks. The jacket 31 includes a base 31 and a hinged lid 33. A tray 34 having a spindle 35 adapted to fit the centering aperture 17 of the record 12 is secured to the base 32. The tray 34 has a rim portion 36 which is raised with respect to the record-supporting portion of the tray. The inner wall of rim portion 36 serves as the protective wall portion 27" that defines the above-described well 26" for receiving the record 12. A soft pad 38 is mounted on the lid 33 for securing the record 12 in place when the lid 33 is closed and the record is in the well 26 for storage.

FIG. 9 illustrates a method of picking up the record from the jacket 31 in a manner that renders it unnecessary to touch the critical recorded region of the record during the handling thereof.

The well 26 is desirably provided with a cavity 37 shaped and located near its center such that, when the record 12 is in the well 26, the cavity 37 lies under the finger holes despite the rotational orientation of the record therein. The depth of the cavity 37, 37', and 37" is chosen to permit sufficient penetration of a person's fingers to permit obtaining a good grasp of the disc record 12 for removal purposes. In the players of FIGS. 1—4, the cavity 37, and 37' is formed in a region of the turntable 18 surrounding the spindle 20; while in the jacket of FIG. 7, the cavity 37" is formed in a region of the tray 34 surrounding spindle 35.

What is claimed is:

1. A record protection system comprising:
  1. a record having an outer periphery, a central unrecorded region, and a recorded region disposed between said outer periphery and said central unrecorded region; said central unrecorded region including finger receiving holes for facilitating the manual handling of said record;
  2. record receiving means including a wall portion defining the edge of a well for removably receiving said record; and
  3. a cover mounted for motion between a closed position and an open position relative to said record receiving means;
    the construction of said record protection system being such that said well is exposed to permit manual placement and removal of the record, when said cover is in said open position; and
    wherein the spacing between said wall portion and said outer periphery of said record, when in said well, is such that grasping of said outer periphery of said record directly with human fingers is precluded.

2. A combination as defined in claim 1 wherein said receiving means comprises a record player for playing back signals stored in the recorded region of the record, wherein said record player includes a platform having a record supporting portion for supporting the record during playback, and wherein the bottom of said record receiving well is formed by said record supporting portion of said platform.

3. Apparataus in accordance with claim 2 wherein said platform is provided with a cavity in a region beneath the finger holes in said record when in place, and said cavity being depressed relative to said record supporting portion of said platform.

4. A combination as defined in claim 1 wherein the receiving means comprise means for storing the disc record between playbacks, and wherein said storing means includes a record supporting portion forming the bottom of said well, and an elevated portion surrounding said record supporting portion and forming said protective wall portion.

5. Apparatus in accordance with claim 4 wherein said storing means further includes a spindle portion dimensioned for reception within the central aperture of said disc record, and a cavity surrounding said spindle portion, said cavity being depressed relative to said record supporting portion.

6. A disc record player for use with a disc record having a circular outer periphery, a central unrecorded region provided with a centering aperture, and a recorded region disposed between the outer periphery and the central unrecorded region; the central unrecorded region including finger receiving holes for facilitating the manual handling of the record; said player comprising:
   1. a base;
   2. a cover mounted for motion between a closed position and an open position relative to said base;
   3. a rotatable platform mounted on said base for supporting a disc record during playback therefor; and
   4. a circular wall surrounding said rotatable platform and defining therewith a well in which the disc record is removably received during playback;
   the construction of said player being such that said well is exposed to permit manual placement and removal of the disc record prior to an after playback, when said cover is in said open position; and
   the spacing between said wall surrounding said rotatable platform and the outer periphery of the disc record, received in said well, being sufficiently small as to preclude hand grasping of the outer periphery of the disc record for its removal from said well.

7. Apparatus in accordance with claim 6 wherein said record player includes a turntable having a record supporting portion forming said rotatable platform, and an elevated rim portion forming said circular wall.

8. Apparatus in accordance with claim 6 also including a spindle secured to said rotatable platform and dimensioned for penetration of the central aperture of a disc record received in said well, and wherein a region of said platform surrounding said spindle is depressed relative to a record supporting region thereof.

9. A disc record jacket for storing a disc record having a circular outer periphery of a given diameter, a central unrecorded region provided with a centering aperture, a recorded region disposed between the outer periphery and the inner unrecorded region; the inner unrecorded region including finger receiving holes for facilitating the manual handling of the record; said jacket comprising:
   1. a tray having a circular well therein for removably receiving the disc record; and
   2. a cover mounted for motion between a closed position and an open position relative to said tray;
   the construction of said jacket being such that said well is exposed to permit manual placement and removal of the disc record, when said cover is in said open position; and
   said well having a circular wall of a diameter exceeding said given diameter by a dimension sufficiently small as to preclude hand grasping of the outer periphery for removal of the disc record received in said well.

10. A disc record jacket for storing a disc record having a circular outer periphery of a given diameter, a central unrecorded region provided with a centering aperture, a recorded region disposed between the outer periphery and the central unrecorded region; and the disc record having a plurality of finger receiving holes in the central unrecorded region surrounding the centering aperture for facilitating the manual handling of the disc record; said jacket comprising:
   1. a tray having a circular well therein for removably receiving the disc record; and
   2. a cover mounted for motion between a closed position and an open position relative to said tray;
   the construction of said jacket being such that said well is exposed to permit manual placement and removal of the disc record, when said cover is in said open position;
   said well having a circular wall of a diameter exceeding said given diameter by a dimension sufficiently small as to preclude hand grasping of the outer periphery for removal of the disc record received in said well; and
   said well having a bottom including a record supporting region and a cavity depressed relative to said record supporting region, said cavity being so located as to extend beneath the finger holes when the disc record is received in said well.

11. Apparatus in accordance with claim 10 also including a spindle centrally positioned within said well and dimensioned for penetration of said central aperture of a disc received in said well.

12. A disc record protection system comprising:
   1. a disc record having a circular outer periphery, a central unrecorded region provided with a centering aperture, and a recorded region disposed between said outer periphery and said central unrecorded region; said central unrecorded region including means for facilitating the manual handling of said disc record;
   2. disc record receiving means including a wall portion defining the edge of a well for removably receiving said disc record; and
   3. a cover mounted for motion between a closed position and an open position relative to said disc record receiving means;
   the construction of said disc record protection system being such that said well is exposed to permit placement and removal of the disc record, when said cover is in said open position; and
   wherein the spacing between said wall portion and said outer periphery of said record, when in said well, is such that grasping of said outer periphery of said record directly with human fingers is precluded.

* * * * *